United States Patent
Jepperson

(10) Patent No.: US 11,422,517 B2
(45) Date of Patent: Aug. 23, 2022

(54) AUTOMATED TRANSFER OF ITEMS BETWEEN COMPARTMENTS OF A SMART APPLIANCE

(71) Applicant: International Business Machines Corporation, Armonk, NY (US)

(72) Inventor: Jacob Ryan Jepperson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 645 days.

(21) Appl. No.: 16/431,766

(22) Filed: Jun. 5, 2019

(65) Prior Publication Data

US 2020/0387122 A1  Dec. 10, 2020

(51) Int. Cl.
| | |
|---|---|
| *G05B 15/02* | (2006.01) |
| *G06F 16/22* | (2019.01) |
| *G06K 9/00* | (2022.01) |
| *G06F 40/279* | (2020.01) |
| *G06V 20/00* | (2022.01) |

(52) U.S. Cl.
CPC ............ *G05B 15/02* (2013.01); *G06F 16/22* (2019.01); *G06F 40/279* (2020.01); *G06V 20/00* (2022.01)

(58) Field of Classification Search
CPC ....... G05B 15/02; G06F 16/22; G06F 40/279; G06V 20/00; G06V 20/68; F25D 13/06;
(Continued)

(56) References Cited

U.S. PATENT DOCUMENTS

| 4,368,625 A | * | 1/1983 | Platt | ..................... F25D 25/00 |
| | | | | 62/378 |
| 5,711,160 A | * | 1/1998 | Namisniak | ................ G09F 9/00 |
| | | | | 368/106 |

(Continued)

FOREIGN PATENT DOCUMENTS

| CN | 102012146 A | 4/2011 |
| CN | 102213518 A | 10/2011 |
| CN | 102824099 B | 2/2015 |

OTHER PUBLICATIONS

Anonymous, "A System and Method for a Dynamic Refrigeration System," IP.com, Disclosure No. IPCOM000253142D, Mar. 8, 2018, 9 pages.
(Continued)

*Primary Examiner* — Ramesh B Patel
(74) *Attorney, Agent, or Firm* — Alex Harvey

(57) ABSTRACT

One example of a method comprises identifying contents of a freezer compartment and a refrigerator compartment of a refrigeration appliance. The freezer compartment is separated from the refrigerator compartment by a barrier having a sealable aperture. The method further comprises predicting a use time for a first food item located in the freezer compartment based on user data related to the identified contents of the freezer compartment; calculating an amount of time needed to defrost the first food item in the refrigerator compartment based on sensor data received from the refrigeration appliance regarding environmental conditions of the refrigeration compartment; determining a transfer
(Continued)

time based on the predicted use time and on the amount of time needed to defrost the first food item; and outputting instructions to automatically transfer the first food item from the freezer compartment through the sealable aperture to the refrigerator compartment at the determined transfer time.

20 Claims, 8 Drawing Sheets

(58) Field of Classification Search
CPC .. F25D 29/00; F25D 2500/06; F25D 2600/06; A23L 3/36; G06K 9/6267
See application file for complete search history.

(56) References Cited

U.S. PATENT DOCUMENTS

| | | | | |
|---|---|---|---|---|
| 6,557,760 | B2* | 5/2003 | Goodwin, III | G06Q 30/06 235/383 |
| 7,907,054 | B1* | 3/2011 | Nguyen | G06Q 20/203 340/3.1 |
| 8,629,753 | B2* | 1/2014 | Yum | G06Q 10/087 340/3.7 |
| 9,639,823 | B2* | 5/2017 | Park | G06F 7/06 |
| 9,773,436 | B2* | 9/2017 | Myers | G09F 13/22 |
| 10,027,866 | B2* | 7/2018 | Carlotto | H04N 5/247 |
| 10,724,757 | B2* | 7/2020 | Froehlich | F25D 29/003 |
| 2015/0016712 | A1 | 1/2015 | Rhoads | |
| 2015/0285552 | A1* | 10/2015 | Swaidan | F25D 23/12 62/155 |
| 2018/0137457 | A1* | 5/2018 | Sachs | G06Q 30/0277 |
| 2018/0224151 | A1* | 8/2018 | Froehlich | F25D 29/003 |
| 2020/0387122 | A1* | 12/2020 | Jepperson | G06F 40/279 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

AUTOMATED TRANSFER OF ITEMS BETWEEN COMPARTMENTS OF A SMART APPLIANCE

BACKGROUND

Excess time and energy can often be spent in preserving and preparing various food items. For example, the amount of energy to freeze an item and then subsequently use a microwave to defrost the item later can be an inefficient use of time and/or energy. Additionally, items can often be defrosted too long, which impacts quality of the item and energy used to defrost it. Similarly, items can be maintained in a freezer or refrigerator beyond a point of usefulness for the item, affecting both quality and energy usage.

SUMMARY

Aspects of the disclosure may include a computer implemented method, computer program product, and system. One example of the computer-implemented method comprises identifying contents of a freezer compartment of a refrigeration appliance and contents of a refrigerator compartment of the refrigeration appliance. The freezer compartment is configured to maintain the contents of the freezer compartment at a temperature below a freezing temperature and the refrigerator compartment is configured to maintain the contents of the refrigerator compartment above the freezing temperature. The freezer compartment is separated from the refrigerator compartment by a barrier having a sealable aperture. The method further comprises predicting a use time for a first food item located in the freezer compartment based on user data related to the identified contents of the freezer compartment; calculating an amount of time needed to defrost the first food item in the refrigerator compartment based on sensor data received from the refrigeration appliance regarding environmental conditions of the refrigeration compartment and based on data retrieved from a database configured to store data regarding the first food item; determining a transfer time based on the predicted use time and on the amount of time needed to defrost the first food item; and outputting instructions to automatically transfer the first food item from the freezer compartment through the sealable aperture to the refrigerator compartment at the determined transfer time.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
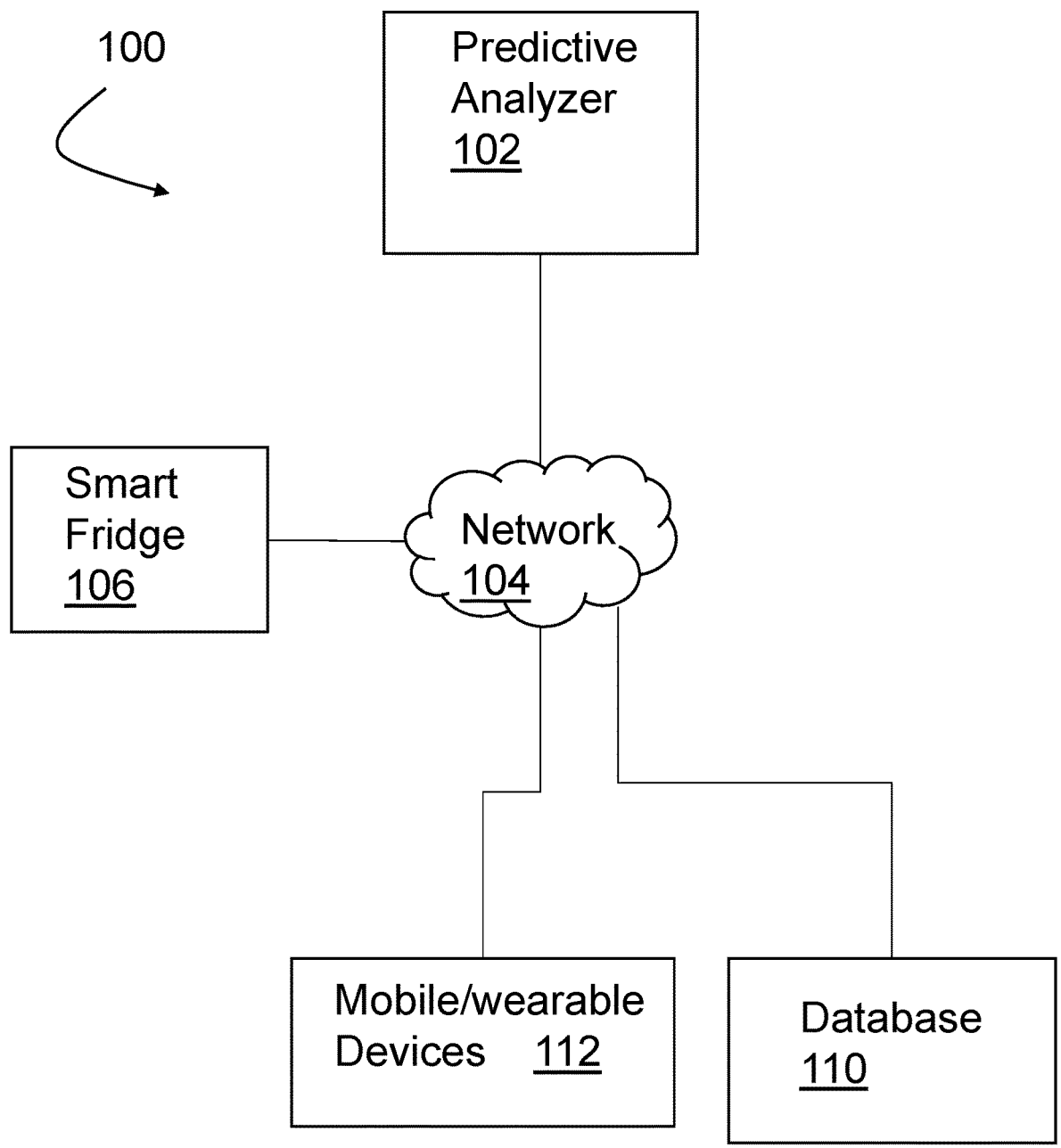
FIG. 1 is a high-level block diagram of one embodiment of an example system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high-level block diagram of one embodiment of an example system 100. The example system 100 includes smart fridge 106, one or more mobile devices 112, and database 110 communicatively coupled with predictive analyzer 102 via network 104. As used herein, the term mobile device can refer to any portable device such as, but not limited to, a smart phone, tablet, wearable device, augmented reality (AR)/virtual reality (VR) device, etc.

The network 104 can be implemented using any number of any suitable physical and/or logical communications topologies. The network 104 can include one or more private or public computing networks. For example, network 104 may comprise a private network (e.g., a network with a firewall that blocks non-authorized external access) that is associated with the workload. Alternatively, or additionally, network 104 may comprise a public network, such as the Internet. Thus, network 104 may form part of a packet-based network, such as a local area network, a wide-area network, and/or a global network such as the Internet. Network 104 can include one or more servers, networks, or databases, and can use one or more communication protocols to transfer data between predictive analyzer 102 and smart fridge 106, mobile devices 112, and database 110. Furthermore, although illustrated in FIG. 1 as a single entity, in other examples network 104 may comprise a plurality of networks, such as a combination of public and/or private networks. The communications network 104 can include a variety of types of physical communication channels or "links." The links can be wired, wireless, optical, and/or any other suitable media. In addition, the communications network 104 can include a variety of network hardware and software for performing routing, switching, and other functions, such as routers, switches, base stations, bridges or any other equipment that may be useful to facilitate communicating data. Furthermore, it is to be understood that although smart fridge 106, mobile devices 112, and database 110 are depicted in the example of FIG. 1 as being communicatively coupled to the predictive analyzer 102 via the same network 104, for purposes of illustration, the smart fridge 106, mobile devices 112 and database 110 can be coupled to the predictive analyzer 102 via separate networks, in other embodiments. For example, in some embodiments, mobile devices 112 can be communicatively coupled to the predictive analyzer 102 via a cellular network while the database 110 is communicatively coupled to the predictive analyzer 102 via a local area network.

The predictive analyzer 102 receives data from the smart fridge 106, mobile devices 112, and database 110 and analyzes the received data to predict when to move items automatically between compartments of the smart fridge 106. For example, the smart fridge 106 includes, in some embodiments, a plurality of sensors configured to capture data regarding items placed in a refrigeration compartment and items placed in a freezer compartment. The plurality of sensors in the smart fridge 106 can include, but are not limited to, cameras configured to capture images of the items in the smart fridge and environmental sensors configured to collect data regarding environment conditions in each of the refrigeration and freezer compartments that can affect stability of the food items in the smart fridge 106, such as temperature, humidity, ambient light, etc. Additionally, in some embodiments, the smart fridge 106 includes a user interface configured to receive user input, such as, but not limited to, identification of items placed in the smart fridge 106, date items are placed in the smart fridge 106, user preferences, etc. The smart fridge 106 communicates the collected data over the network 104 to the predictive analyzer 102.

As discussed above, the one or more mobile devices 112 can include different types of devices, such as, but not limited to, mobile phones, AR/VR devices, tablets, etc. Each type of mobile device 112 is configured to provide data to the predictive analyzer 102 via the network 104. The specific data provided by each mobile device 112 can vary based on the type of device and its respective capabilities. For example, in some embodiments, a mobile phone equipped with a camera and running an app on the mobile phone can collect images of food items, such as items being placed in smart fridge 106 or items being purchased or considered at a grocery store. Similarly, AR/VR devices can be used to capture images of food items. The captured images can also include images of a recipe, in some embodiments. In some such embodiments, the predictive analyzer 102 can use natural language processing techniques to determine the ingredients needed for the recipe and determine if any of the ingredients are currently in one of the compartments of the smart fridge 106 and when to move such ingredients from a freezer compartment to a refrigeration compartment, if needed.

In addition to capturing images, the mobile devices 112 and/or the smart fridge 106 can be configured to perform optical character recognition (OCR) in some embodiments. For example, OCR can be used to identify the names of items, recommended storage conditions, estimated expiration dates, etc. from analyzing images of the food items' labels. In some embodiments, OCR processing is performed by the predictive analyzer 102. Scanning the barcode can also include obtaining a recipe and a list of ingredients for the recipe.

Additionally, in some embodiments, the mobile devices 112 can collect other data, such as but not limited to, location data of a user, calendar data, user preferences, etc. Such data can be collected over a period of time, in some embodiments, and provided to the predictive analyzer 102 to determine trends and timing of activities. For example, the predictive analyzer 102 can determine that a particular user typically eats at a certain time each weekday, that a particular user typically eats a certain food on a given day of the week, etc. Similarly, the data can be used to identify how long it typically takes for a user to arrive at the user's residence, appointments that may alter typical/historical behavior and/or timing of historical behavior, etc. The calendar data can also be used to enable a user to explicitly set anticipated eating times, menus, etc.

In addition, the mobile devices 112 can be configured to provide other types of data in various embodiments. For example, in some embodiments, one or more mobile devices 112 can be configured to scan 2-dimensional (2D) or 3-dimensional (3D) bar codes. The scanned bar codes on a food items package can provide relevant information regarding the food contained in the package. For example, some grocery delivery services can include a package containing multiple items. Scanning a barcode on the package can enable the mobile device 112 to automatically identify the items in the package, recommended storage conditions for each item, recommended dates by which to consume the food items, etc. Such data is then communicated to the predictive analyzer 102 over the network 104.

The predictive analyzer 102 can also obtain or retrieve data from the database 110 that is used to predict when to move items between compartments of the smart fridge 106. For example, the predictive analyzer can obtain information regarding average or expected lengths of times that specific items can be safely stored in a refrigerator component. For example, the data in the database 110 can indicate that certain items, like poultry, can be safely stored for a first amount of time in the refrigerator component and that other items, like fruit, can be safely stored for a second, different amount of time in the refrigerator component. Similarly, the database 110 can include data on the average amount of time it takes a food item to thaw at a given temperature after being removed from a freezer compartment, as well as, recommended maximum times for freezing an item, if applicable. Thus, the predictive analyzer 102 can take into account not just pre-computed data, such as printed expiration dates on package labels, but also specific storage recommendations based on the different food items and environmental conditions of the various compartments of the smart fridge 106.

Additionally, in some embodiments, the predictive analyzer 102 can obtain images from the database 110. For example, in some such embodiments, the predictive analyzer 102 can obtain images of various states or conditions of a given food item, such as ripening stages of fruit, rotten or spoiled meat, etc. In some such embodiments, the predictive analyzer 102 can use machine learning techniques to identify and/or classify the state of food items based on analysis of images captured from the smart fridge 106 and/or mobile devices 112. For example, in some such embodiments, the images from the database 110 can be used to train a neural network that is then used to identify and classify the food items in the images received from the smart fridge 106 and/or mobile devices 112. In other embodiments, the images obtained from the smart fridge 106 and/or mobile devices 112 can be compared directly to the images from the database 110 to identify and or classify the food items.

Based on the data received from the smart fridge 106, mobile devices 112, and/or database 110, the predictive analyzer 102 determines whether an item should be moved from one compartment of the smart fridge 106 to another. For example, the predictive analyzer 102 can determine if an item in a refrigeration compartment should be moved to a freezer compartment or vice versa. In addition, the predictive analyzer 102 determines when to move the item from one compartment to another. For example, the time to move the item can be based on the specific food item, an estimated time for using the item, length of time to defrost an item, estimated amount of time the food item can be safely stored in its current compartment, etc. The predictive analyzer 102 communicates commands to the smart fridge 106 to move selected items at the estimated times based on analysis of the predictive analyzer 102. Although the predictive analyzer 102 is communicatively coupled with the smart fridge 106 over a network 104 in the example shown in FIG. 1, it is to be understood that, in other embodiments, the predictive analyzer 102 is integrated as part of a control unit of the smart fridge 106, in other embodiments.

Operation of components of the example system 100 is described in more detail below, such as through the description of an example smart fridge 200 depicted in FIG. 2, an example predictive analyzer 400 depicted in FIG. 4, an example smart fridge control unit 500 depicted in FIG. 5, and an example method 600 of automated transferring of items between compartments in FIG. 6.

Figure 2:
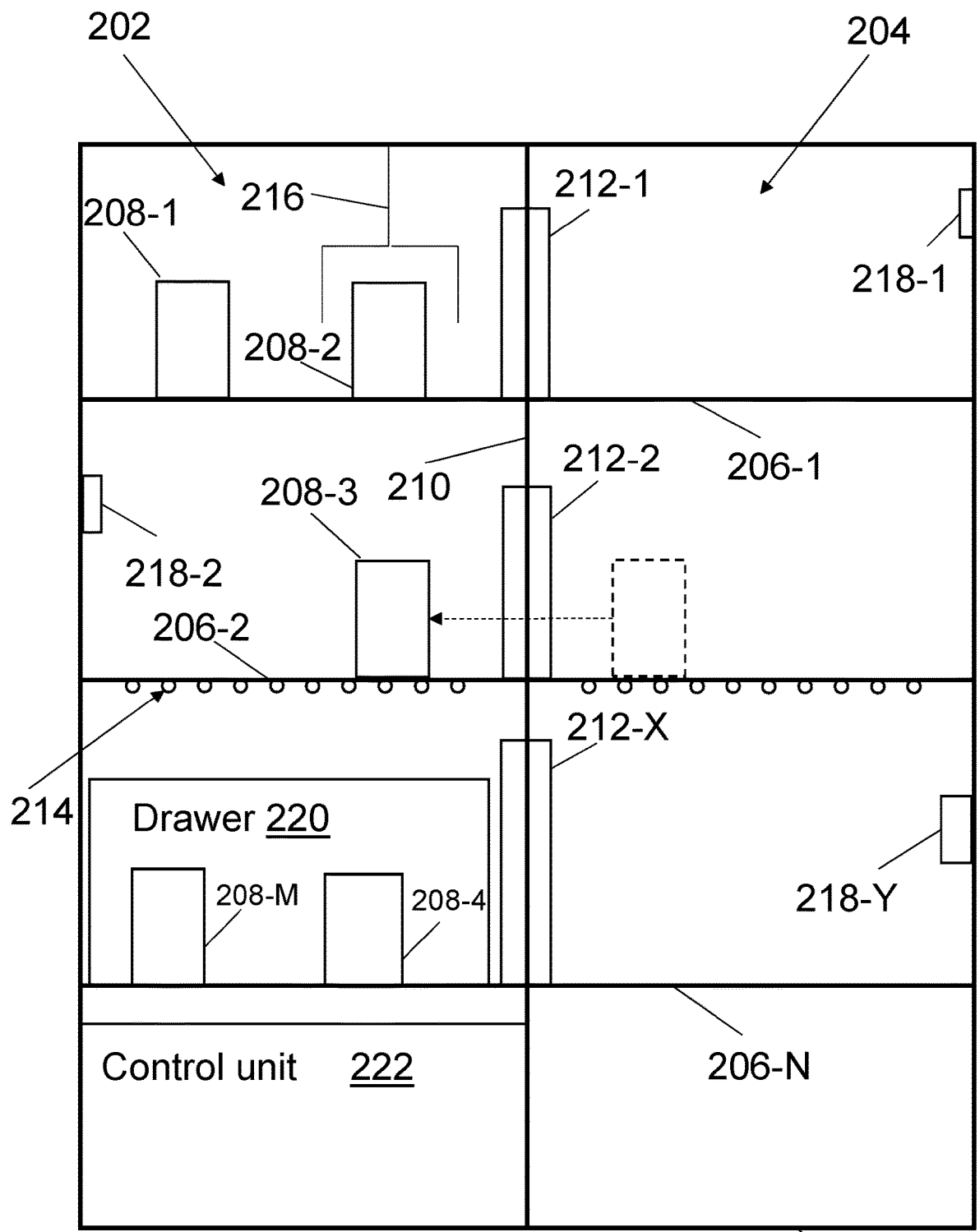
FIG. 2 is a high-level block diagram depicting one embodiment of an example smart fridge.

FIG. 2 is a high-level block diagram depicting one embodiment of an example smart fridge 200. The example smart fridge 200 can be implemented as the smart fridge 106 in system 100 of FIG. 1. Smart fridge 200 includes a refrigeration section or compartment 202 and a freezer section or compartment 204. Each section/compartment 202 and 204 includes a plurality of shelves 206-1 . . . 206-N (referred to collectively as shelves 206) on which food items 208-1 . . . 208-M are located (referred to collectively as food items 208). The freezer compartment 204 is configured to maintain the contents of the freezer compartment 204 at a temperature below the freezing temperature, whereas the refrigeration compartment 202 is configured to maintain the contents of the refrigeration compartment 202 above the freezing temperature.

The food items 208 can be placed in either compartment 202 or 204 by a user. In addition, the smart fridge 200 includes a plurality of sensors 218-1 . . . 218-Y (referred to collectively as sensors 218), control unit 222, and one or more apertures 212-1 . . . 212-X (referred to collectively as apertures 212) in wall 210. It is to be understood that each of the apertures 212 are sealable. In other words, each of the apertures 212 can be opened and closed to aid in controlling the environment (e.g. temperature) of each of the compartments 202 and 204.

The sensors 218 are configured to collect data used by predictive analyzer 102 to predict which items to transfer between compartments 202/204 and when. For example, in some embodiments, one or more of sensors 218 is a camera configured to capture image of items placed in smart fridge 200. The predictive analyzer 102 is configured to analyze the images, in some such embodiments, to identify the items, to determine a state or condition of the identified items, and/or process labels on the food items through natural language processing and OCR techniques. In some embodiments, one or more of sensors 218 is implemented as an environmental sensor to measure environmental conditions of one of compartments 202 or 204. For example, each of the compartments 202 and 204 can include one or more environmental sensors configured to measure temperature, humidity, ambient light, etc. The environmental data is communicated to the predictive analyzer for use in determining which items to transfer and when. For example, the predictive analyzer can use the environmental data to more accurately determine how long a frozen item needs to defrost if transferred to the refrigeration compartment 202, how long a given food item can be safely stored in the refrigeration compartment 202 before needing to be transferred to the freezer compartment 204, etc. It is to be understood that the number and type of sensors in each compartment of smart fridge 200 can vary in different embodiments.

The control unit 222 is configured to receive data from the one or more sensors 218 and communicate the data to the predictive analyzer, such as via network 104 in FIG. 1, in some embodiments. In other embodiments, the control unit 222 is configured to implement the functionality of the predictive analyzer described herein. In yet other embodiments, some functionality of the predictive analyzer is performed by the control unit 222 and other functionality is performed by a separate predictive analyzer communicatively coupled with the control unit 222 over a network. For example, in some such embodiments, the control unit 222 can be configured to analyze images received from one or more sensors 218 to identify food items and/or the state of the identified food items and to communicate the identity and/or state of the food item over a network to the predictive analyzer for use in determining which items to transfer and when.

The control unit 222 is also configured to receive instructions or data from the predictive analyzer and to control the transfer of food items between compartments 202 and 204. For example, in response to instructions to move item 208-2 from the refrigeration compartment 202 to the freezer compartment 204, the control unit outputs commands to mechanical arm 216 to control the mechanical arm 216 in maneuvering the food item 208-2 through the aperture 212-1. It is to be understood that mechanical arm 216 is just one example embodiment of a mechanical means for transferring items between compartments 202 and 204. In other embodiments, other mechanical structures can be used. For example, smart fridge 200 also includes conveyor belt 214 and drawer 220. Conveyor belt 214 can move individual items, such as item 208-3 which has been transferred from compartment 204 through aperture 212-2 into compartments 202, as indicated by the dashed lines. A high-level top view of one example of a conveyor belt 300 which can be used in smart fridge 200 is described in more detail below with respect to FIG. 3. Drawer 220 is configured to move between compartments 202 and 204, such that all food items 208 placed in drawer 220 are transferred together. It is to be understood that the above example structures for moving items between compartments are provided by way of example only and that, in other embodiments, other structures can be used. Furthermore, it is to be understood that the configuration of smart fridge 200, including the location and size of the compartments 202/204, the shelves 206, the control unit 222, etc., are provided by way of example for purposes of explanation only and that, in other embodiments, smart fridge 200 can be implemented with a different configuration.

The following example use cases are provided for illustrative purposes only to further explain operation of some embodiments of system 100 and interaction between components of the system 100. The use cases are described with respect to the example smart fridge 200 depicted in FIG. 2 and the example system 100 depicted in FIG. 100.

In a first example use case, a user has placed chicken in the freezer compartment 204. The control unit 222 or the predictive analyzer 102 can be configured to identify that the chicken is in the freezer compartment 204, such as, but not limited to, by performing image analysis on images captured by one or more sensors 208, by performing image analysis on images captured by a user's mobile device 112, and/or by processing user input data such as through a user interface on a mobile device 112 or a user interface in the smart fridge 200. It is to be understood that all or part of the functionality of the predictive analyzer 102 can be implemented in the control unit 222. Thus, for purposes of explanation of the example use cases, reference is made to the predictive analyzer 102. However, it is to be understood that in other embodiments, the control unit 222 can be configured to perform all or part of the functionality of the predictive analyzer 102 described in the use cases below.

Subsequently, the predictive analyzer 102 receives from the user an indication of a recipe for dinner which includes chicken and vegetables. For example, the user can indicate a recipe with a mobile device 112, such as by capturing an image of a recipe, scanning a barcode for a recipe, or visiting a webpage containing the recipe. The predictive analyzer 102 can identify that the chicken is already present in the smart fridge 200 and that the needed vegetables for the recipe are not located in the smart fridge 200. As a result, the predictive analyzer 102 can optionally communicate to the user's mobile device 112 that the chicken is in the smart fridge 200, but that the vegetables are not so that the user can make a decision to obtain any missing ingredients and not purchase additional ingredients that are already present, if desired. Additionally, the predictive analyzer 102 analyzes user data, such as historical user behavior and calendar data which can be stored in one or more databases 110, to predict when the user intends to prepare the recipe, etc. This analysis can be done using machine learning techniques known to one of skill. Based on the predicted time for beginning preparation of the recipe, the predictive analyzer 102 calculates the amount of time needed to thaw the frozen chicken and sends a command to the smart fridge 200 to transfer the frozen chicken from the freezer compartment 204 to the refrigeration compartment 202, such that the chicken is thawed by the predicted time for preparing the recipe. Based on the commands to transfer the frozen chicken, the control unit 222 directs operation of a mechanical structure, such as mechanical arm 216, to transfer the frozen chicken.

In a second use case, the user has registered with a food delivery service. After receiving the delivered package, the user can review the contents of the package with a mobile device 112, such as an Augmented Reality (AR) device. The AR device can capture data to identify food items and/or recipes, such as by scanning a barcode or capturing images. The delivered package can include a scheduled cooking date for each of the food items which is captured by the AR device. The predictive analyzer 102 receives the data captured by the AR device and determines when to move specific items from the freezer compartment 204 to the refrigeration compartment 202 as discussed above.

In a third use case, chicken has been placed by a user in the refrigeration compartment 202. Based on data from sensors 218, mobile devices 112, database 110 and/or user input data via a user interface, the predictive analyzer 102 determines for how long the chicken can be safely stored in the refrigeration compartment 202. For example, the predictive analyzer 102 can identify a printed expiration date on a label for the chicken through natural language processing, as discussed above. Additionally, the predictive analyzer can obtain data regarding the specific environment, such as temperature, humidity, etc., of the refrigeration compartment 202 as well as empirical data regarding the length of time chicken can be safely stored at the specific environmental conditions of the refrigeration compartment 202. In addition, the predictive analyzer 102 can obtain images of the chicken to analyze the current state of the chicken. Based on analysis of the received data discussed above and/or other data regarding affecting storage of the chicken, the predictive analyzer computes a length of time that the chicken can be safely stored in the refrigeration compartment 202. The predictive analyzer 102 is configured to compare the computed length of time to a predicted time of use for the chicken. For example, as discussed above, the predictive analyzer 102 can calculate a predicted time of use based on historical user patterns, user calendars, etc. In response to determining that the chicken is not predicted to be used prior to expiration of the calculated length of time that the chicken can be safely stored in the refrigeration compartment 202, the predictive analyzer 102 outputs instructions to the smart fridge 200 to transfer the chicken to the freezer compartment 204.

In some embodiments, the predictive analyzer 102 is also configured to monitor contents of the smart fridge 200 to determine if the chicken is used at the predicted time of use. For example, in some embodiments, the predictive analyzer 102 estimates that the chicken will be used prior to expiration of the calculated length of time for safely storing the chicken in the refrigeration compartment 202. However, after periodically monitoring the contents of the smart fridge, through data from sensors 218 for example, the predictive analyzer 102 determines that the chicken was not used when predicted. Thus, in response to such a determination, in some embodiments, the predictive analyzer 102 computes a new predicted time of use and begins the process again. In other embodiments, the predictive analyzer 102 sends instructions to move the chicken to the freezer compartment 204 in response to determining that the chicken was not used at the predicted time.

It is to be understood that the above use cases are provided by way of example only and that operation of the smart fridge 200 and predictive analyzer 102 can be implemented in different ways in other embodiments and use cases. For example, the smart fridge 200 can also be configured to determine how long an item can be safely stored in the freezer compartment 204 and transfer the item to the refrigeration compartment 202 accordingly. Additionally, in some such embodiments, the smart fridge 200 can communicate with a mobile device 112 of the user to inform them that the item was moved and an estimate use by date for the item moved. The smart fridge 200 and/or predictive analyzer 102 can also communicate with a user's mobile device 112 prior to transferring an item to obtain approval from the user. For example, during a training phase for the predictive analyzer 102, the requests for approval can be sent to learn a user's pattern of behavior.

Additionally, in some embodiments, the smart fridge 200 is connected to a smart speaker/voice assistant, such as, but not limited to Google Home, which includes a microphone and speaker for enabling spoken communication between a user and the smart fridge. For example, through the smart speaker, the user can provide spoken identification of contents being placed in the smart fridge 200 or a calendar entry for using a given food item in the smart fridge 200. Additionally, the user can provide feedback to the system 100 through a user interface or the smart speaker. For example, if an item is transferred between compartments that the user does not approve of, the user can provide feedback which is used by the predictive analyzer 102 to update future predictions. Additionally, the predictive analyzer 102 can obtain feedback automatically, such as by detecting that a user has moved a transferred food item back to the original compartment after being moved by the smart fridge 200. Thus, the predictive analyzer 102 is able to learn and adapt automatically to improve predictions over time. Also, by enabling the smart fridge 200 to automatically transfer items between compartments based on the predicted times, the embodiments described herein enable the smart fridge 200 to reduce waste by automatically moving items to the appropriate compartment as well as increase convenience for a user by predicting when the item will be used and transferring the item to the appropriate compartment for use by the user at the predicted time.

Figure 3:
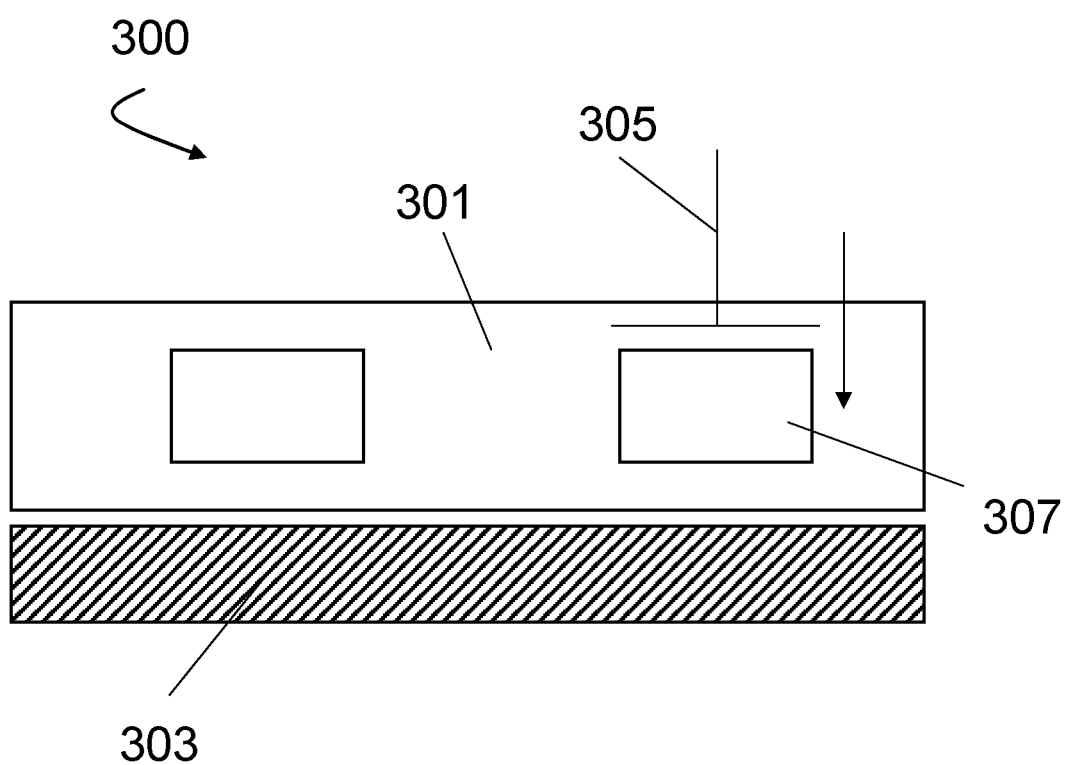
FIG. 3 is a high-level top view of one embodiment of an example shelf.

FIG. 3 is a high-level top view of one embodiment of an example shelf 300. The example shelf 300 includes a stationary portion 301 and a conveyor belt 303. A mechanical arm 305 is configured to push an item, such as item 307 from the stationary portion 301 to the conveyor belt 303 under the direction of a control unit, such as control unit 202. The shelf 300 is one example implementation of the conveyor belt 214 in shelf 206-2 of FIG. 2. In this way, the smart fridge can selectively move items from a shelf between compartments by using a conveyor belt 303.

Figure 4:
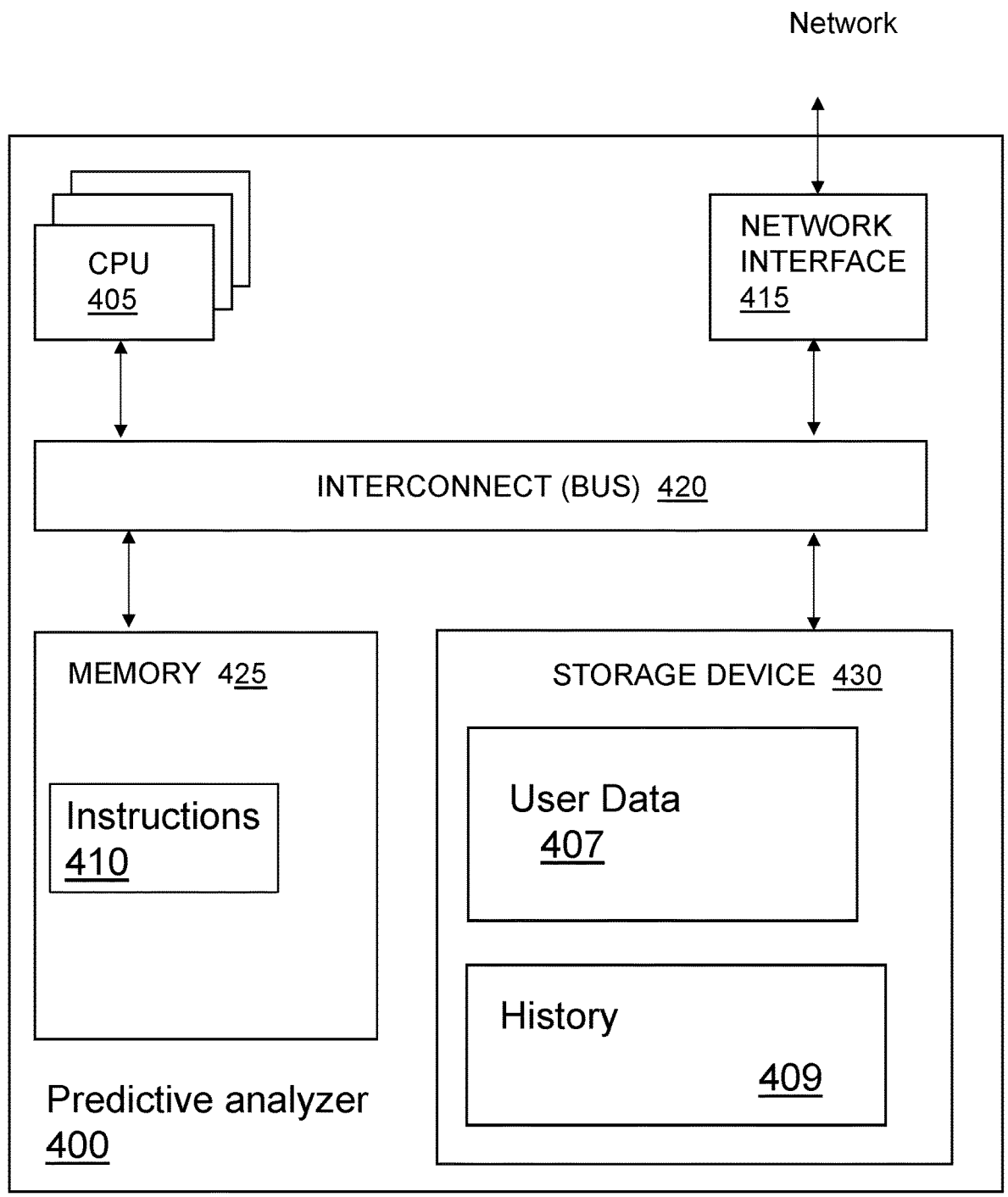
FIG. 4 is a block diagram of one embodiment of an example predictive analyzer.

FIG. 4 is a block diagram of one embodiment of an example predictive analyzer 400. The predictive analyzer 400 can be implemented as predictive analyzer 102 in FIG. 1. In the example shown in FIG. 4, the predictive analyzer 400 includes a memory 425, storage 430, an interconnect (e.g., BUS) 420, one or more processors 405 (also referred to as CPU 405 herein), and a network interface 415. It is to be understood that the predictive analyzer 400 is provided by way of example only and that the predictive analyzer can be implemented differently in other embodiments. For example, in other embodiments, some of the components shown in FIG. 4 can be omitted and/or other components can be included.

Each CPU 405 retrieves and executes programming instructions stored in the memory 425 and/or storage 430. The interconnect 420 is used to move data, such as programming instructions, between the CPU 405, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a processor 405 can be a digital signal processor (DSP). Memory 425 is generally included to be representative of a random access memory (e.g., static random access memory (SRAM), dynamic random access memory (DRAM), or Flash). The storage 430 is generally included to be representative of a non-volatile memory, such as a hard disk drive, solid state device (SSD), removable memory cards, optical storage, or flash memory devices. In an alternative embodiment, the storage 430 can be replaced by storage area-network (SAN) devices, the cloud, or other devices connected to the predictive analyzer 400 via a communication network coupled to the network interface 415.

In some embodiments, the memory 425 stores instructions 410 and the storage 430 stores user data 407 and history data 409. This history data 409 can include historical activity of the user and/or empirical data regarding food items. For example, the history data 409 can include patterns of food purchases, length of time an item is typically left in the smart fridge prior to use, patterns for consuming a food item on a particular day, patterns of recipes used based on store purchases, etc. The user data 407 can include user preferences, user calendar data, etc. In other embodiments, the instructions 410, the user data 407, and the history data 409 are stored partially in memory 425 and partially in storage 430, or they are stored entirely in memory 425 or entirely in storage 430, or they are accessed over a network via the network interface 415. Additionally, as discussed above, the user data 407 and history data 409 can be stored in a database or memory device accessed via the network interface 415 rather than being locally attached or integrated with the predictive analyzer 400.

When executed, the instructions 410 cause the CPU 405 to analyze the data received over the network interface 415 as well as user data 407 and/or history data 409 in order to perform the functionality discussed above with respect to predictive analyzer for determining when to transfer food items between compartments automatically. The instructions 410 further cause the CPU 405 to output signals and commands to the smart fridge via network interface 215. The output signals and commands contain information related to moving the food items according to the predicted times. Further details regarding operation of the predictive analyzer 400 are also described below with respect to method 600.

Figure 5:
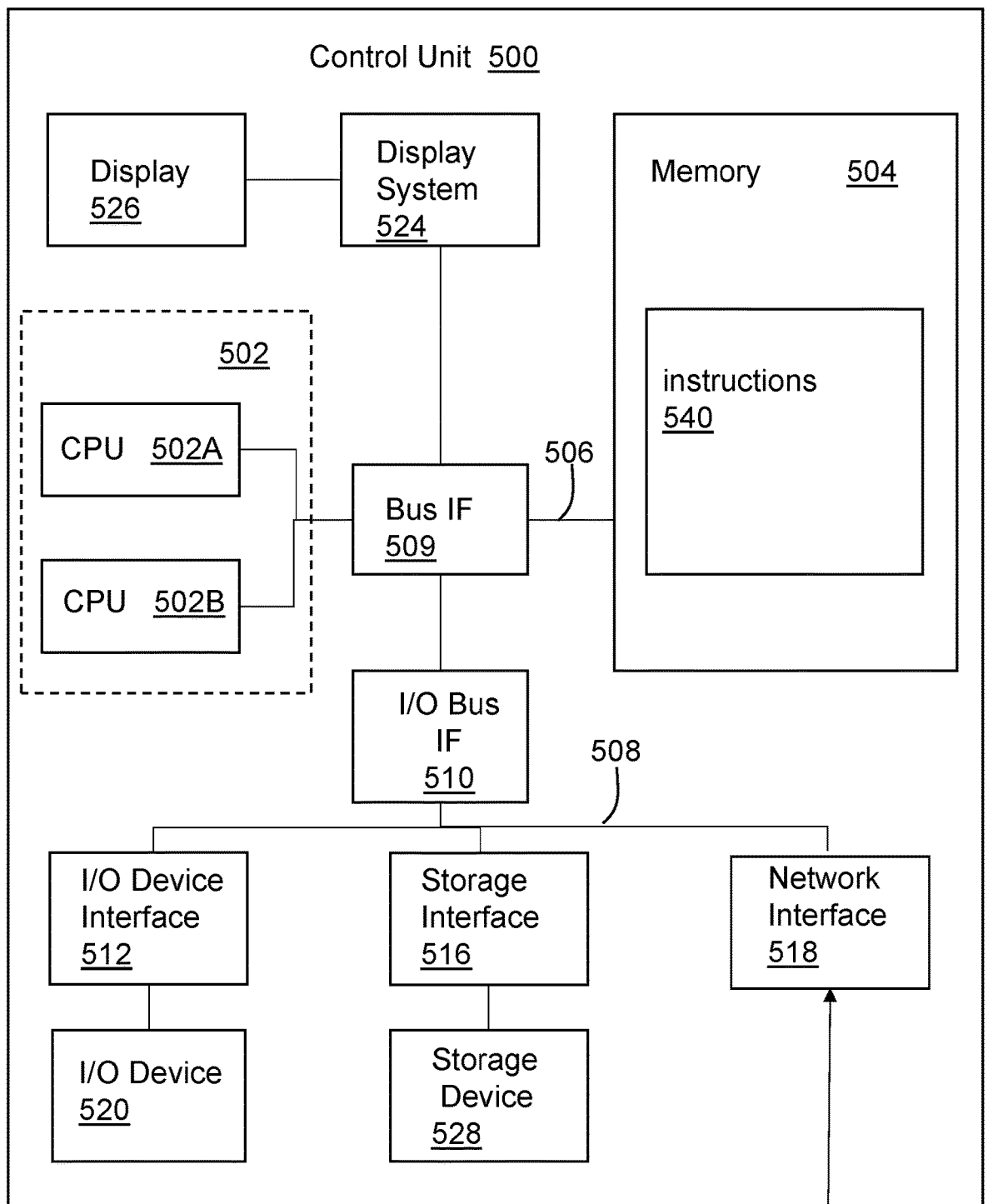
FIG. 5 is a high-level block diagram of one embodiment of an example control unit.

FIG. 5 is a high-level block diagram of one embodiment of an example control unit 500. The components of the control unit 500 shown in the example of FIG. 5 include one or more processors 502, a memory 504, a storage interface 516, an Input/Output ("I/O") device interface 512, and a network interface 518, all of which are communicatively coupled, directly or indirectly, for inter-component communication via a memory bus 506, an I/O bus 508, bus interface unit ("IF") 509, and an I/O bus interface unit 510.

In the embodiment shown in FIG. 5, the control unit 500 also includes one or more general-purpose programmable central processing units (CPUs) 502A and 502B, herein generically referred to as the processor 502. In some embodiments, the control unit 500 contains multiple processors. However, in other embodiments, the control unit 500 is a single CPU system. Each processor 502 executes instructions stored in the memory 504.

In some embodiments, the memory 504 includes a random-access semiconductor memory, storage device, or storage medium (either volatile or non-volatile) for storing or encoding data and programs. For example, the memory 504 stores instructions 540. When executed by a processor such as processor 502, the instructions 540 cause the processor 502 to perform the functions and calculations for transferring items between compartments, as discussed above with respect to control unit 222. Furthermore, in some embodiments, the instruction 540 cause the processor 502 to perform one or more of the functions discussed herein with respect to the predictive analyzer.

In some embodiments, the memory 504 represents the entire virtual memory of the control unit 500 and may also include the virtual memory of other computer systems coupled directly to the control unit 500 or connected via a network. In some embodiments, the memory 504 is a single monolithic entity, but in other embodiments, the memory 504 includes a hierarchy of caches and other memory devices. For example, the memory 504 can exist in multiple levels of caches, and these caches may be further divided by function, so that one cache holds instructions while another holds non-instruction data, which is used by the processor. The memory 504 may be further distributed and associated with different CPUs or sets of CPUs, as is known in any various so-called non-uniform memory access (NUMA) computer architectures, for example.

Hence, although the instructions 540 are stored on the same memory 504 in the example shown in FIG. 5 for purposes of explanation, it is to be understood that other embodiments can be implemented differently. For example, the instructions 540 can be distributed across multiple physical media.

Furthermore, in some embodiments, the instructions 540 are executed by the same processor 502. However, in other embodiments, execution of the instructions 540 is distributed across multiple processors located in the same or different computer systems. For example, in some such embodiments, at least a portion of the instructions and data structures associated with the instructions 540 can be on different computer systems and accessed remotely, e.g., via the network interface 518. The control unit 500 can use virtual addressing mechanisms that allow the programs of the control unit 500 to behave as if it only has access to a large, single storage entity instead of access to multiple, smaller storage entities. Thus, the memory 504 can store all or a portion of the various programs, modules, and data structures for providing order identification of luggage as described herein.

The control unit 500 in the embodiment shown in FIG. 5 also includes a bus interface unit 509 to handle communications among the processor 502, the memory 504, the display system 524, and the I/O bus interface unit 510. The I/O bus interface unit 510 is coupled with the I/O bus 508 for transferring data to and from the various I/O units. In particular, the I/O bus interface unit 510 can communicate with multiple I/O interface units 512, 516, and 518, which are also known as I/O processors (IOPs) or I/O adapters (IOAs), through the I/O bus 508. The display system 524 includes a display controller, a display memory, or both. The display controller can provide video, audio, or both types of data to a display device 526. The display memory may be a dedicated memory for buffering video data. The display system 524 is coupled with the display device 526, such as a standalone display screen, computer monitor, television, a tablet or handheld device display, or other displayable device. In some embodiments, the display device 526 also includes one or more speakers for rendering audio, such as announcing movement of an item from one compartment of the smart fridge to another. Alternatively, one or more speakers for rendering audio may be coupled with an I/O interface unit. In alternate embodiments, one or more functions provided by the display system 524 are on board an integrated circuit that also includes the processor 502. In addition, in some embodiments, one or more of the functions provided by the bus interface unit 509 is on board an integrated circuit that also includes the processor 502.

The I/O interface units support communication with a variety of storage and I/O devices. For example, the I/O device interface unit 512 supports the attachment of one or more user I/O devices 520, which may include user output devices (such as a video display device, speaker, fax machine, printer, and/or television set) and user input devices (such as a keyboard, mouse, keypad, touchpad, trackball, buttons, light pen, or other pointing devices). A user can manipulate the user input devices 520 using a user interface, in order to provide input data and commands to the user I/O device 520 and the control unit 500. Additionally, a user can receive output data via the user output devices. For example, a user interface may be presented via the user I/O device 520, such as displayed on a display device, played via a speaker, or printed via a printer.

The storage interface 516 supports the attachment of one or more disk drives or direct access storage devices 528 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 528 is implemented via any type of secondary storage device. The contents of the memory 504, or any portion thereof, may be stored to and retrieved from the storage device 528 as needed. The network interface 518 provides one or more communication paths from the control unit 500 to other digital devices and computer systems, such as the predictive analyzer, mobile devices, and/or database discussed above.

Although the control unit 500 shown in FIG. 5 illustrates a particular bus structure providing a direct communication path among the processors 502, the memory 504, the bus interface 509, the display system 524, and the I/O bus interface unit 510, in alternative embodiments the control unit 500 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the control unit 500, can include multiple I/O bus interface units 510 and/or multiple I/O buses 508 in other embodiments. While multiple I/O interface units are shown, which separate the I/O bus 508 from various communication paths running to the various I/O devices, in other embodiments, some or all of the I/O devices are connected directly to one or more system I/O buses.

As discussed above, in some embodiments, one or more of the components and data shown in FIG. 5 include instructions or statements that execute on the processor 502 or instructions or statements that are interpreted by instructions or statements that execute the processor 502 to carry out the functions as described herein. In other embodiments, one or more of the components shown in FIG. 5 are implemented in hardware via semiconductor devices, chips, logical gates, circuits, circuit cards, and/or other physical hardware devices in lieu of, or in addition to, a processor-based system. In addition, in other embodiments, some of the components shown in FIG. 5 can be omitted and/or other components can be included. For example, in some embodiments, the display device 526 and display system 524 can be omitted.

Figure 6:
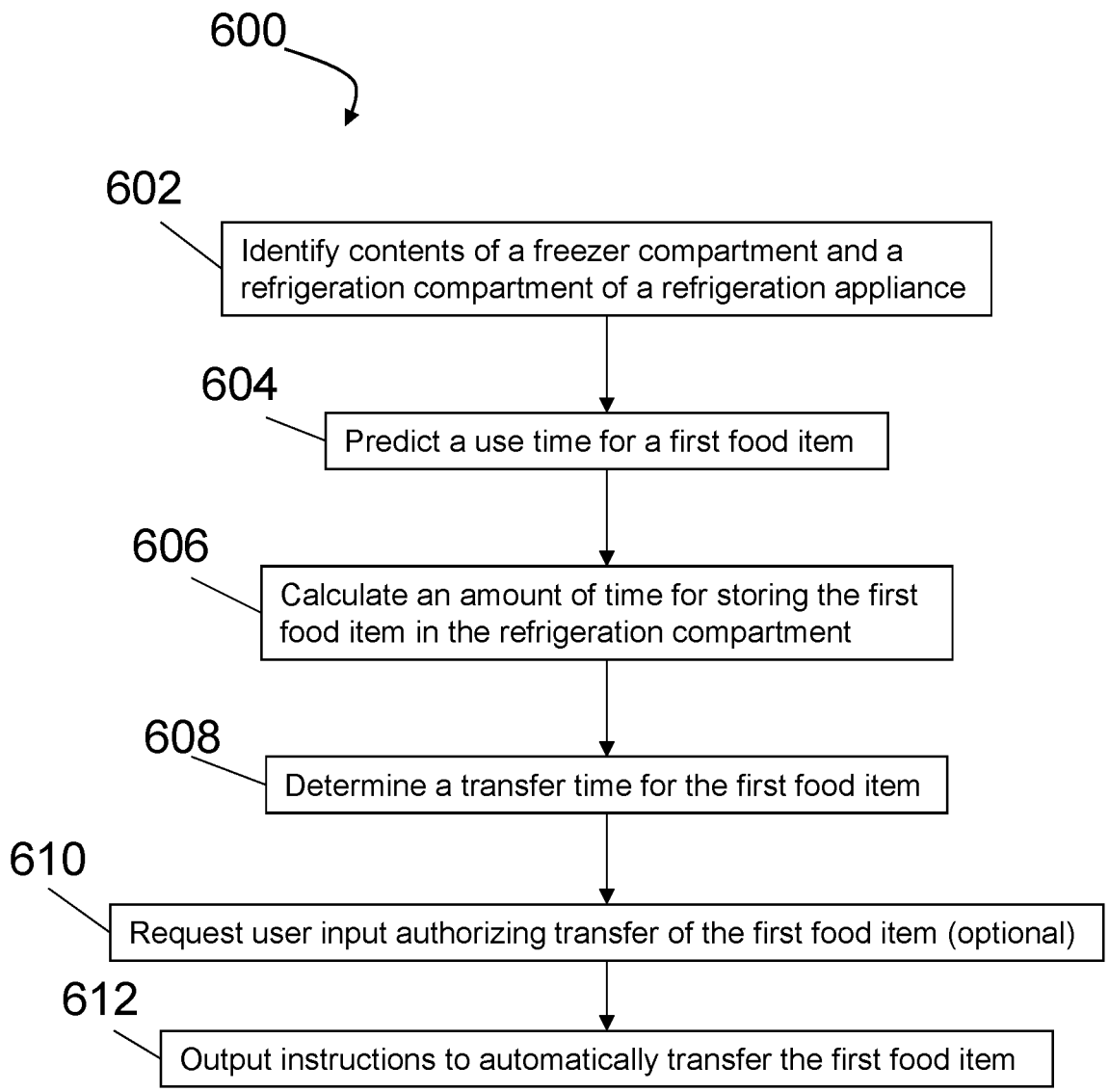
FIG. 6 is a flow chart of one embodiment of an example method of automated transferring of items between compartments.

FIG. 6 is a flow chart of one embodiment of an example method 600 of automated transferring of items between compartments. Method 600 can be implemented by a predictive analyzer, such as predictive analyzer 102 or 400 described above. For example, the method 600 can be implemented by a CPU, such as CPU 405 in predictive analyzer 400, executing instructions, such as instructions 410. It is to be understood that the order of actions in example method 600 is provided for purposes of explanation and that the method can be performed in a different order in other embodiments. Similarly, it is to be understood that some actions can be omitted or additional actions can be included in other embodiments.

At 602, the contents of a freezer compartment and a refrigeration compartment of a refrigeration appliance, such as smart fridge 200, are identified. As discussed above, the freezer compartment and the refrigeration compartment are separated by a barrier having a sealable barrier. As discussed above, the contents of the freezer compartment and the refrigeration compartment can be identified by analyzing images captured by cameras in the refrigeration appliance, in some embodiments. However, as discussed above, the contents of the refrigeration appliance can be identified in different ways in other embodiments. For example, in some embodiments, in addition to or in lieu of analyzing images, the contents can be identified using data input by a user, such as through a user interface of the refrigeration appliance.

At 604, a use time for a first food item is predicted based on user data related to the identified contents of the refrigeration appliance. For example, the user data can include, but is not limited to, historical behavior data for the user, location data for the user, and calendar data for the user, as discussed above. In some embodiments, the first food item is located in the freezer compartment. In other embodiments, the first food item is located in the refrigeration compartment. At 606, an amount of time for storing the first food item in the refrigeration compartment is calculated. For example, in some embodiments where the first food item is located in the freezer compartment, the amount of time for storing the first food item is an amount of time for defrosting the first food item in the refrigeration compartment based, for example, on the size and type of food as well as environmental conditions, such as temperature, of the refrigeration compartment, as discussed above. In other embodiments where the first food item is located in the refrigeration compartment, the amount of time to store the first food item in the refrigeration compartment is an estimated stored time for safely storing the first food item in the refrigeration compartment, as discussed above. For example, this can include calculating the amount of time based on identifying the state of first food item through image analysis, analyzing a label with an expiration date, analyzing environmental conditions of the refrigeration compartment, etc.

At 608, a transfer time for the first food item is determined. In some embodiments, the transfer time is a time at which to transfer the first food item from the freezer compartment to the refrigeration compartment. In other embodiments, the transfer time is at time at which to transfer the first food item from the refrigeration compartment to the freezer compartment. For example, the transfer time can be based on a calculated amount of time to defrost the first food item in the refrigeration compartment. In other embodiments, the transfer time is based on the estimated time for safely storing the first food item in the refrigeration compartment. For example, the estimated storage time can be compared to the predicted use time and, in response to determining that the estimated storage time is less than the second predicted use time, the transfer time can be computed as a time based on the estimated storage time. In other words, if the estimated storage time will elapse prior to the predicted use time, the predictive analyzer determines that the first food item should be transferred to the freezer compartment, as discussed above. For example, in some such embodiments, the transfer time can be at the end of the estimated storage time. In other embodiments, the predictive analyzer is configured to compute a sooner transfer time when the first food item is not predicted to be used prior to the end of the estimated storage time. For example, the transfer time can be approximately at the time the predictive analyzer determines that the first food item will not be used prior to the end of the estimated storage time.

At 610, an optional notification can be sent to a user requesting authorization to transfer the first food item, as discussed above. In some such embodiments, the first food item is not transferred unless user input authorizing the transfer is received. In other some such embodiments, the first food item is transferred in the event that no response is received or if an approval is received. In other words, the default in such embodiments is to transfer the first food item absent an explicit rejection from the user. In other embodiments, authorization is not requested prior to automatically transferring the first food item. At 612, instructions to automatically transfer the first food item through an aperture in the harrier are output. The instructions can cause a mechanical device, such as an arm or conveyor belt to transfer the first food item, as discussed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
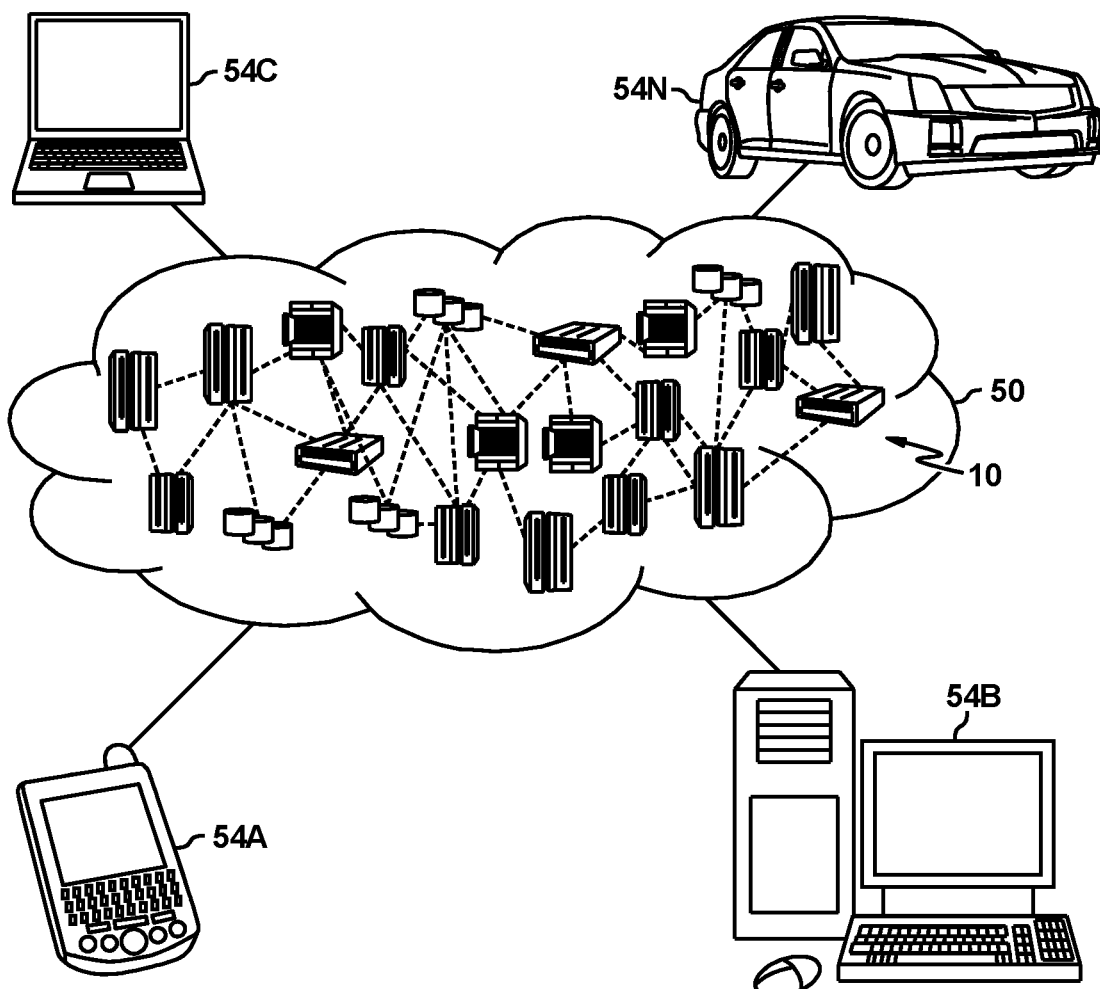
FIG. 7 depicts one embodiment of a cloud computing environment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
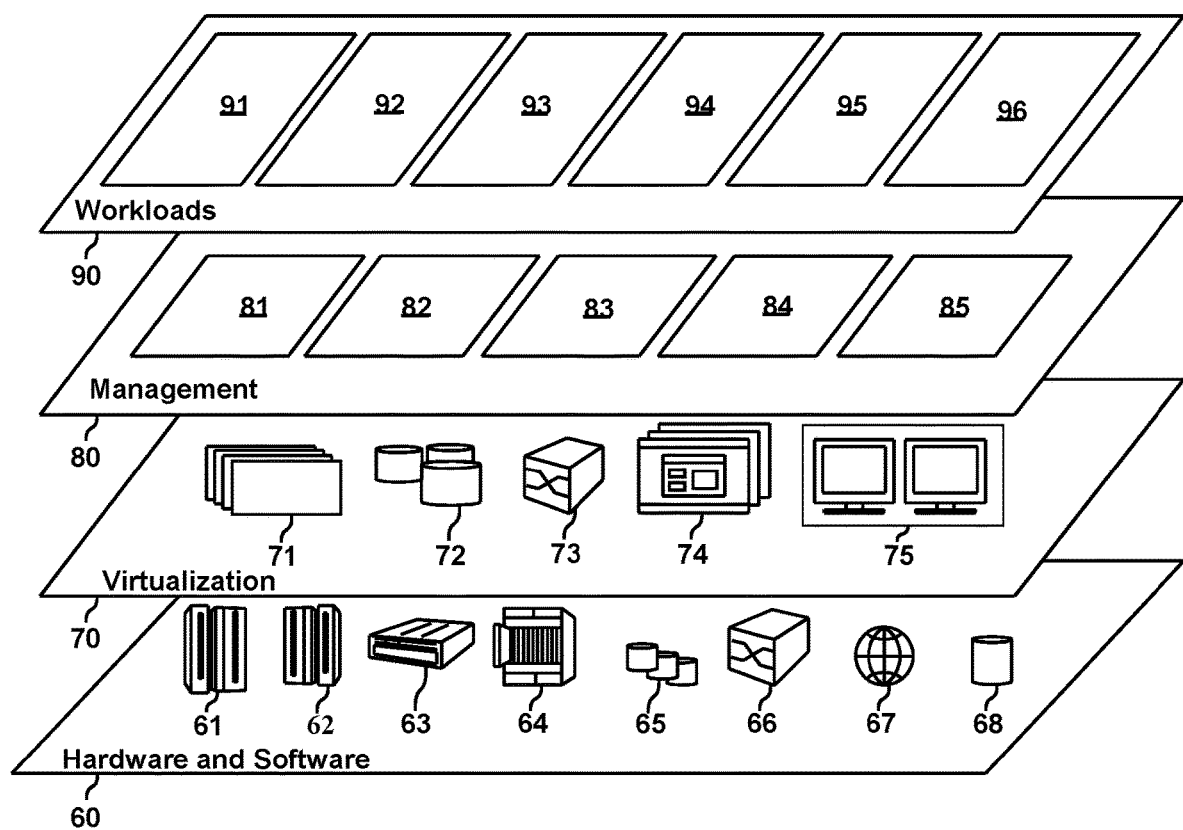
FIG. 8 depicts one embodiment of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compartment transfer prediction processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
    identifying contents of a freezer compartment of a refrigeration appliance and contents of a refrigerator compartment of the refrigeration appliance, the freezer compartment configured to maintain the contents of the freezer compartment at a temperature below a freezing temperature and the refrigerator compartment configured to maintain the contents of the refrigerator compartment above the freezing temperature, wherein the freezer compartment is separated from the refrigerator compartment by a barrier having a sealable aperture;
    predicting a use time for a first food item located in the freezer compartment based on user data related to the identified contents of the freezer compartment;
    calculating an amount of time needed to defrost the first food item in the refrigerator compartment based on sensor data received from the refrigeration appliance regarding environmental conditions of the refrigeration compartment and based on data retrieved from a database configured to store data regarding the first food item;
    determining a transfer time based on the predicted use time and on the amount of time needed to defrost the first food item; and
    outputting instructions to cause the refrigeration appliance to automatically transfer the first food item from the freezer compartment through the sealable aperture to the refrigerator compartment at the determined transfer time.

2. The method of claim 1, predicting the use time for the first food item includes:
receiving a recipe over a network from a mobile device; and
analyzing the recipe using natural language processing to identify a plurality of ingredients including the first food item.

3. The method of claim 2, wherein receiving the recipe over the network from a mobile device comprises one of:
receiving an image of a recipe from a camera integrated into the mobile device; and
receiving a digital recipe from the mobile device obtained in response to scanning a barcode with the mobile device.

4. The method of claim 2, further comprising:
determining that a second ingredient of the plurality of ingredients is not located in the freezer compartment or in the refrigerator compartment; and
in response to determining that the second ingredient is not located in the freezer compartment or in the refrigerator compartment, sending a notification to the user.

5. The method of claim 1, wherein predicting the use time for the first food item comprises predicting the use time based on historical behavior data for the user, location data for the user, and calendar data for the user.

6. The method of claim 1, further comprising:
identifying a second food item located in the refrigerator compartment;
determining an estimated storage time for storing the second food item in the refrigerator compartment based at least in part on the sensor data received from the refrigeration appliance regarding environmental conditions of the refrigeration compartment;
determining a second predicted use time for the second food item based on user data related to the second food item;
comparing the estimated storage time to the second predicted use time;
in response to determining that the estimated storage time is less than the second predicted use time, outputting instructions to automatically transfer the second food item from the refrigerator compartment through the sealable aperture to the freezer compartment.

7. The method of claim 1, further comprising:
outputting a notification requesting user input authorizing transfer of the first food item from the freezer compartment to the refrigerator compartment; and
in response to receiving the user input authorizing the transfer of the first food item, outputting the instructions to automatically transfer the first food item.

8. The method of claim 1, wherein identifying the contents of the freezer compartment and the contents of the refrigerator compartment comprises analyzing a plurality of images captured by a plurality of cameras located in the refrigeration appliance.

9. A system comprising:
an interface configured to transmit and receive data; and
a processor communicatively coupled to the interface and configured to:
identify contents of a freezer compartment of a refrigeration appliance and contents of a refrigerator compartment of the refrigeration appliance, the freezer compartment configured to maintain the contents of the freezer compartment at a temperature below a freezing temperature and the refrigerator compartment configured to maintain the contents of the refrigerator compartment above the freezing temperature, wherein the freezer compartment is separated from the refrigerator compartment by a barrier having a sealable aperture;
predict a use time for a first food item located in the freezer compartment based on user data related to the identified contents of the freezer compartment;
calculate an amount of time needed to defrost the first food item in the refrigerator compartment based on sensor data regarding environmental conditions of the refrigeration compartment and based on data retrieved from a database configured to store data regarding the first food item;
determine a transfer time based on the predicted use time and on the amount of time needed to defrost the first food item; and
output, via the interface, instructions to cause the refrigeration appliance to automatically transfer the first food item from the freezer compartment through the sealable aperture to the refrigerator compartment at the determined transfer time.

10. The system of claim 9, wherein the processor is further configured to:
receive, via the interface, a recipe over a network from a mobile device; and
analyze the recipe using natural language processing to identify a plurality of ingredients including the first food item.

11. The system of claim 10, wherein the processor is further configured to:
determine that a second ingredient of the plurality of ingredients is not located in the freezer compartment or in the refrigerator compartment; and
in response to determining that the second ingredient is not located in the freezer compartment or in the refrigerator compartment, send a notification to the user via the interface.

12. The system of claim 9, wherein the processor is configured to predict the use time for the first food item based on historical behavior data for a user, location data for the user, and calendar data for the user.

13. The system of claim 9, wherein the processor is further configured to:
identify a second food item located in the refrigerator compartment;
determine an estimated storage time for storing the second food item in the refrigerator compartment based at least in part on the sensor data received from the refrigeration appliance regarding environmental conditions of the refrigeration compartment;
determine a second predicted use time for the second food item based on user data related to the second food item;
compare the estimated storage time to the second predicted use time;
in response to determining that the estimated storage time is less than the second predicted use time, output instructions to automatically transfer the second food item from the refrigerator compartment through the sealable aperture to the freezer compartment.

14. The system of claim 9, wherein the processor is configured to identify the contents of the freezer compartment and the contents of the refrigerator compartment based on a plurality of images captured by a plurality of cameras located in the refrigeration appliance.

15. A computer program product comprising a computer readable storage medium having a computer readable program stored therein, wherein the computer readable program, when executed by a processor, causes the processor to:
- identify contents of a freezer compartment of a refrigeration appliance and contents of a refrigerator compartment of the refrigeration appliance, the freezer compartment configured to maintain the contents of the freezer compartment at a temperature below a freezing temperature and the refrigerator compartment configured to maintain the contents of the refrigerator compartment above the freezing temperature, wherein the freezer compartment is separated from the refrigerator compartment by a barrier having a sealable aperture;
- predict a use time for a first food item located in the freezer compartment based on user data related to the identified contents of the freezer compartment;
- calculate an amount of time needed to defrost the first food item in the refrigerator compartment based on sensor data regarding environmental conditions of the refrigeration compartment and based on data retrieved from a database configured to store data regarding the first food item;
- determine a transfer time based on the predicted use time and on the amount of time needed to defrost the first food item; and
- output instructions to cause the refrigeration appliance to automatically transfer the first food item from the freezer compartment through the sealable aperture to the refrigerator compartment at the determined transfer time.

16. The computer program product of claim 15, wherein the computer readable program is further configured to cause the processor to:
- receive a recipe over a network from a mobile device; and
- analyze the recipe using natural language processing to identify a plurality of ingredients including the first food item.

17. The computer program product of claim 16, wherein the computer readable program is further configured to cause the processor to:
- determine that a second ingredient of the plurality of ingredients is not located in the freezer compartment or in the refrigerator compartment; and
- in response to determining that the second ingredient is not located in the freezer compartment or in the refrigerator compartment, send a notification to the user via the interface.

18. The computer program product of claim 15, wherein the computer readable program is further configured to cause the processor to predict the use time for the first food item based on historical behavior data for a user, location data for the user, and calendar data for the user.

19. The computer program product of claim 15, wherein the computer readable program is further configured to cause the processor to:
- identify a second food item located in the refrigerator compartment;
- determine an estimated storage time for storing the second food item in the refrigerator compartment based at least in part on the sensor data received from the refrigeration appliance regarding environmental conditions of the refrigeration compartment;
- determine a second predicted use time for the second food item based on user data related to the second food item;
- compare the estimated storage time to the second predicted use time;
- in response to determining that the estimated storage time is less than the second predicted use time, output instructions to automatically transfer the second food item from the refrigerator compartment through the sealable aperture to the freezer compartment.

20. The computer program product of claim 15, wherein the computer readable program is further configured to cause the processor to identify the contents of the freezer compartment and the contents of the refrigerator compartment based on a plurality of images captured by a plurality of cameras located in the refrigeration appliance.

* * * * *